United States Patent
Zhou et al.

(10) Patent No.: US 8,488,934 B2
(45) Date of Patent: Jul. 16, 2013

(54) HIGH DENSITY FIBER DISTRIBUTION HUB

(75) Inventors: Junsheng Zhou, Shanghai (CN); Zhiyong Xu, Shanghai (CN); Ping Wang, Shanghai (CN); Pierre Bonvallat, Cluses (FR)

(73) Assignee: 3M Innovative Properties Company, St. Paul, MN (US)

( * ) Notice: Subject to any disclaimer, the term of this patent is extended or adjusted under 35 U.S.C. 154(b) by 245 days.

(21) Appl. No.: 12/867,069

(22) PCT Filed: Feb. 27, 2009

(86) PCT No.: PCT/US2009/035440
§ 371 (c)(1),
(2), (4) Date: Sep. 8, 2010

(87) PCT Pub. No.: WO2009/108846
PCT Pub. Date: Sep. 3, 2009

(65) Prior Publication Data
US 2010/0329624 A1    Dec. 30, 2010

(30) Foreign Application Priority Data
Feb. 27, 2008    (CN) .......................... 2008 1 0081397

(51) Int. Cl.
*G02B 6/46* (2006.01)
(52) U.S. Cl.
USPC ............ 385/135; 385/137; 385/138; 385/139
(58) Field of Classification Search
None
See application file for complete search history.

(56) References Cited

U.S. PATENT DOCUMENTS

| | | | |
|---|---|---|---|
| 5,519,804 A * | 5/1996 | Burek et al. ................. | 385/135 |
| 5,553,186 A * | 9/1996 | Allen ............................ | 385/135 |
| 6,385,381 B1 * | 5/2002 | Janus et al. .................. | 385/135 |
| 6,744,962 B2 * | 6/2004 | Allerellie ..................... | 385/135 |
| 7,333,706 B2 * | 2/2008 | Parikh et al. ................ | 385/135 |
| 8,135,256 B2 * | 3/2012 | Solheid et al. ............... | 385/135 |
| 2007/0031099 A1 | 2/2007 | Herzog et al. | |
| 2008/0050083 A1 * | 2/2008 | Frazier et al. ................ | 385/135 |
| 2009/0238531 A1 * | 9/2009 | Holmberg et al. ........... | 385/135 |

FOREIGN PATENT DOCUMENTS

| | | |
|---|---|---|
| JP | 2003-270503 A | 9/2003 |
| JP | 2004-020707 A | 1/2004 |
| JP | 2007-140302 A | 6/2007 |
| WO | WO 00/58769 | 10/2000 |

* cited by examiner

*Primary Examiner* — Mark Robinson
*Assistant Examiner* — Andrew Jordan
(74) *Attorney, Agent, or Firm* — Janet A. Kling

(57) ABSTRACT

The present invention relates to a fiber distribution hub. The fiber distribution hub comprises a base case comprising at least one port portion for introducing an optical cable, wherein the optical cable includes a first fiber; a splitter case releasably attached to the base case; a splice tray rotatably hinged to the splitter case; and a cover engagable with the base case to enclose the splitter case and the splice tray. The first fiber is connected to a second fiber in the splice tray, and the second fiber is connected with a splitter in the splitter case to separate the second fiber into a plurality of separate third fibers. Thus, the invention provides a compact and modular fiber distribution hub. In addition, the fiber distribution hub can join optical fibers by mechanical splices, fusion splices and fiber optic connectors in a single unit.

17 Claims, 8 Drawing Sheets

US 8,488,934 B2

HIGH DENSITY FIBER DISTRIBUTION HUB

CROSS REFERENCE TO RELATED APPLICATIONS

This application is a national stage filing under 35 U.S.C. 371 of PCT/US2009/035440, filed Feb. 27, 2009, which claims priority to Chinese Patent Application No. 200810081397.6, filed Feb. 27, 2008, the disclosure of which is incorporated by reference in its/their entirety herein.

TECHNICAL FIELD

The present invention relates to optical communication network field, more specially, to a fiber distribution hub for fiber to home at floor building distribution level.

TECHNICAL BACKGROUND

Optical fiber is widely used in modern telecommunication field. Thus, a fiber distribution hub is an important product in an optical fiber communication network. The fiber distribution hub can provide an interface for a subscriber connected by patch cord between main cable and distribution cable. However, the intrinsic attributes of the fiber itself result in limitations to the fiber distribution hub. For example, one of the most important limitations relates to the minimum bending radius of the fiber in use and storage. If the fiber is bent with a radius smaller than the minimum radius of the fiber, the transmission performance of the fiber is reduced. For this reason, the fiber distribution hub should be designed carefully to ensure the minimum bend radius of the fiber is not violated.

Because of the relatively high density of fibers within a system, and because of the need to identify and gain access to individual fiber or groups of fibers for maintenance and/or reallocation, distribution hub arrangements in which subgroups of fibers and connectors are housed in assemblies can have particular advantages. However, conventional fiber distribution hubs are too large to be easily assembled and/or disassembled.

WO 00/58769 filed on Mar. 31, 2000 by N. V. Raychem S. A. discloses an optical fiber folding cassette with an upper portion and a lower portion constituting the fiber tray, in which a splitter can be accommodated. However, in the cassette, a connector can only be provided to connect fiber from the splitter and that entering inside, which can not provide hot melt splice or mechanical splicing. Meanwhile, the folding cassette can only be used for existing tube entry application rather than cable entry application.

Therefore, a need exists for the fiber distribution hub, preferably, providing optical cable entry, cable optical cable fixing, fiber storage etc. while accommodating one or more splitters. In addition, the fiber distribution hub should provide regions for fiber couplings that are as large as possible, and an interface for fiber distribution as well.

SUMMARY OF THE INVENTION

Thus, according to an aspect of the invention, a fiber distribution hub with multiple functions is provided, and the fiber distribution hub can also be separately used. In addition, the fiber distribution hub can be operated easily on site, so that the time for fiber entry and connection is reduced.

Further, the present invention provides a compact and modular fiber distribution hub.

According to another aspect of the invention, a fiber distribution hub can accommodate mechanical fiber splices, hot melt fusion splice sleeve couplings and connector couplings in a single high density fiber distribution hub.

To achieve the above object of the invention, a fiber distribution hub, comprises:
 a base case comprising at least one port portion for introducing an optical cable, wherein the optical cable includes first fiber;
 a splitter case releasably attached to the base case;
 a splice tray rotatably hinged to the splitter case; and
 a cover engagable with the base case to enclose the splitter case and the splice tray,
 wherein the first fiber is connected to a second fiber in the splice tray, and the second fiber is connected with a splitter in the splitter case to separate the second fiber into a plurality of separate third fibers.

Additional aspects and/or advantages of the present invention will be set forth in part in the description which follows and, in part, will be obvious from the description, or may be learned by practice of the present invention.

BRIEF DESCRIPTION OF THE DRAWINGS

Further disclosure, objects, advantages and aspects of the present invention may be better understood by those skilled in the relevant art by reference to the following description of embodiments taken in conjunction with the accompanying drawings, which are given by way of illustration only, and thus are not limiting of the present invention, and in which.

DETAILED DESCRIPTION

Figure 1:
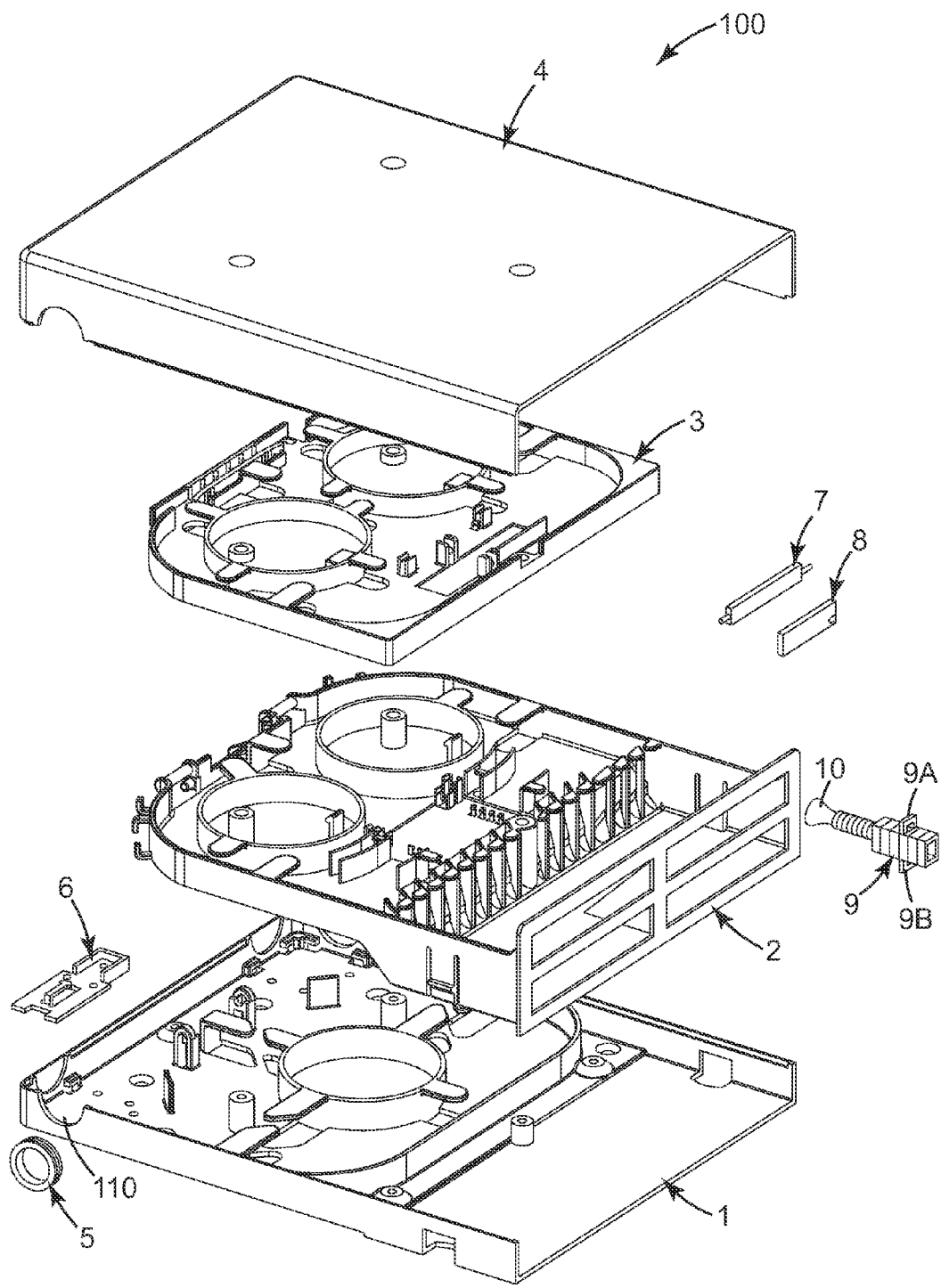
FIG. 1 is an exploded perspective view of a high density fiber distribution hub according to an embodiment of the invention.

The features of the present invention will become readily apparent with reference to accompanying drawings and the detailed description contained hereinafter. Like reference numerals refer to like elements throughout the specification.

The detailed structure of the fiber distribution hub 100 will be described with reference to FIG. 1. Alternatively, this fiber distribution hub may be referred to a fiber distribution terminal or a fiber distribution unit. The fiber distribution hub 100 comprises a base case 1, a splitter case 2, a splice tray 3 and a cover 4. The splice tray 3 is pivotally connected to the splitter case 2. The cover 4 and the base case 1 are engaged to cover the splitter case 2 and the splice tray 3 when the base case 1 and cover 4 are joined together.

The fiber distribution hub 100 can not only be used for existing taut sheath cable but also for in-line cable. The taut sheath cable or in-line cable can enter into the fiber distribution hub 100 from a horizontal or vertical direction relative to the base case 1 shown in FIG. 1, and can exit the fiber distribution hub 100 in either direction.

The fiber distribution hub 100 is further provided with an annular port seal member 5, a bracket 6, a splitter 7, a fan out part 8 and an optical fiber connector adapter 9 (which will be described in detail hereafter). The optical fiber connector adapter 9 can be inserted into the fiber distribution hub 100 to form a patch panel to provide fiber coupling for terminal users. Two optical fiber connectors 10 can be inserted into either side of the optical fiber connector adapter 9 to create optical connection. FIG. 1 shows one optical connector inserted into connector adapter 9. The splitter 7 is provided in the splitter case 2 to achieve concise and neat fiber management.

The structure of the components in the fiber distribution hub 100 and the operations thereof will be described in detail with reference to FIGS. 2-14.

Figure 2:
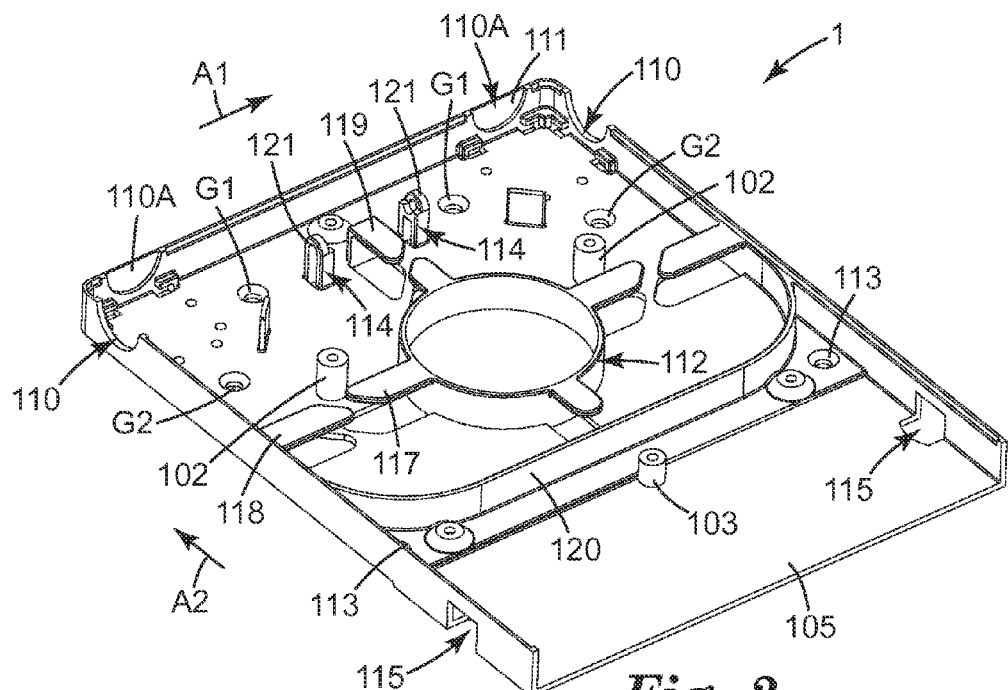
FIG. 2 is a perspective view of a base case of the fiber distribution hub in FIG. 1.

The base case 1 of the fiber distribution hub 100 will be described in detail with reference to FIG. 2. The base case 1 can include a plurality of thin side walls extending perpendicularly from a base and having an open end 105. The base case may have a substantially flat rectangular parallelepiped shape.

Four port portions 110, 110A are formed at the top edge of the walls of the base case 1. Port portions 110 are formed on two opposing wall such that they can accommodate an in-line cable where one of the port portions 110 is an entry portion and the other port portion 110 is an exit port portion. Alternatively the port portions 110 may accommodate standard butt joined cables. Port portions 110A do not have a corresponding exit port portion and as such can accommodate a standard butt joined cable. In one embodiment, port portions 110, 110A may be open semicircular cutouts. In an alternative embodiment, port portions 110, 110A may have a thin web 111 extending across them that can be removed or "knocked out" in the field to provide access to the port portion.

The four port portions on the base case can be engaged with four corresponding port portions (410, shown in FIG. 7) formed on cover 4 of the fiber distribution hub 100 to form complete circular ports for accommodating a port seal member 5. In the embodiment of the present invention, each port is of a semicircular shape, however, the present invention is not limited thereto. The shape of each port can be any shape other than semicircular for facilitating the cable entry into the base case 1, such as rectangular shape or elliptical shape etc.

Figure 13:
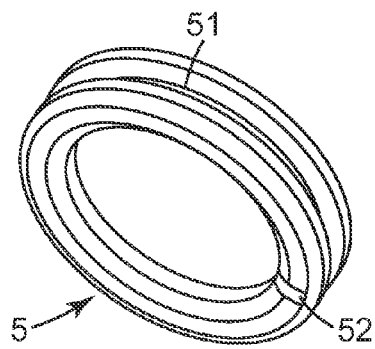
FIG. 13 is a view of a port seal member according to an embodiment of the invention which can be used together with the base case.

The port seal member 5, shown in detail in FIG. 13, can be provided near the port portions 110, 110A. Optical cable can enter through the port seal member 5 into the base case 1. The port seal member 5 may have an enclosed annular shape, with a groove 51 formed along its outer circumference which can be snapped into the port portion 110, 110A so that the port seal member 5 can be securely engaged between the base case 1 and the cover when they are secured together. The port seal member 5 has a tearable connecting part 52 which permits the port seal member to be opened for easy application to an in-line cable or to a previously installed cable in the event that the port seal member needs to be replaced. When the port seal member 5 is used, the tearable connecting part 52 can be torn apart creating a split or opening in the port seal member. The port seal member can then fitted over an in-line optical cable entering through one of semicircular port portion 110 of the base case 1 into the fiber distribution hub 100, so that the fiber distribution hub 100 is sealed and the cable entrance is fixed.

It should be noted that the port portions 110 and the port seal members 5 are constructed to facilitate the entry of different cables, such as a long optical cable that can pass through the base case. The cable enters the base case through one port portion 110 with a port seal member. At least one of the optical fibers from the long optical cable may be routed into the distribution hub to be connected to other optical fibers while the remaining fibers in the long optical pass through the distribution hub undisturbed. The long optical cable exits out of the fiber distribution hub through a second port portion 110 having a port seal member. In addition, an end of an optical cable can be inserted into the base case 1 through the port portion 110, 110A having a port seal member 5. Thus, the above structure achieves the object of passing different cables with a simple structure, and the manufacturing cost is reduced accordingly. Meanwhile, the thickness of the fiber distribution hub 100 can be reduced, so that the fiber distribution hub 100 is more compact without a complicated structure.

A first fiber winding member 112 is provided substantially at the center of the base case 1. Projecting portions 117 are provided regularly around the circumference of the first fiber winding member 112 in right angles. In an embodiment of the invention, there are four projecting portions 117. Two projecting portions 118 are provided on the walls of the base case 1 in corresponding to positions where two of the four projecting portions 117 are arranged. A hook member 119 is provided in corresponding to one of the remaining projecting portions 117. The projecting portions 117 are arranged to be opposite to the hook member 119 and the projecting portions 118. The hook member 119, the projecting portions 117, 118 and a partition wall 120 form a retaining space for storage of slack fiber.

In one exemplary embodiment, two poles 114 may be provided on either side and slightly behind hook member 119 and adjacent to the cable path between port portions 110 of base case 1. Two holes 121 are provided at the top portions of the poles for pivotally connecting with the splitter case 2 (which will be described in detail hereafter). The partition wall 120 is provided in the base case 1 between the first fiber winding member 112 and open end 105.

Redundant fibers in the loose tube of the cable entered through the port portions 110 can be stored in the space, while the fiber stored in the space can be introduced into the splice tray 3 (which will be described in detail later).

Figure 14:
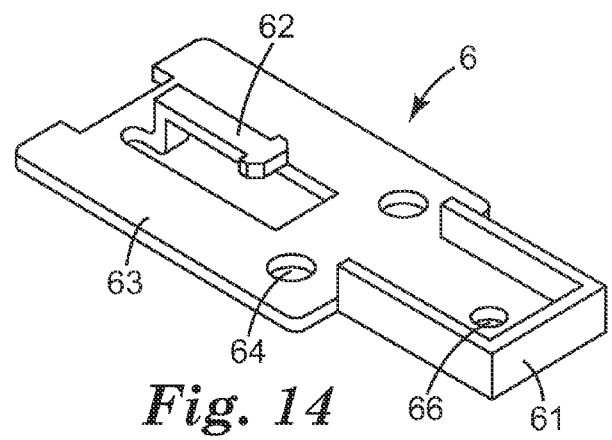
FIG. 14 is a view of a bracket according to an embodiment of the invention for securing a cable entering the base case.

According to an embodiment of the invention, a bracket 6 may be provided for fixing the entering cable through the port portion 110. The bracket 6 is provided adjacent the port portions 110 inside of base case 1. As shown in FIG. 14, the bracket 6 has a frame portion 61 and a hook 62. An end of the hook 62 is integrally formed with the bottom wall 63, with the other end may be formed as a suspended arm. The hook 62 engages with a cable clamp or cable tie to secure the entering cable as it enters base case 1. Two screw holes 64 are provided on the frame portion 61 to fix the bracket to the base case 1 by screws or other mechanical fasteners.

Optionally, another hole 66 may be located at the end of the bracket opposite the hook portion for securing the strength member of the incoming fiber optical cable.

Screw holes 113, G1, G2 are further provided on the base case 1. Screw holes 113 can be used to fix the hub to a wall or other plate. The two sets of holes G1, G2 can be selectively used for fixing the hub to a wall or other plate. In addition, a plurality of first hollow projections 101, 102 and 103 are arranged on the base case 1 to connect with screws.

When the cable 50 enters the base case 1 through the port portion 110, the sheath of the cable is fixed by cable clamp or cable tie fitted over the hook 62 of the bracket 6. Then the first fiber 52 in the cable 50 can be wound around the first fiber winding member 112. Meanwhile, the fiber wound around the first fiber winding member 112 can be introduced into the splice tray from a side along A2 direction of the base case 1. Openings 115 are provided at both long sides of the base case 1 for engaging with clipping members 212 on the splitter case 2 to secure the splitter case in a closed position (which will be described in detail later).

When the cable enters the base case 1 through port portion 110, the cable is fixed by a fixing means (such as a cable clamp or cable tie) to the hook 62 of bracket 6, so that the entering optical cable is fixed accordingly. For the rear portion of the optical cable fixed by the bracket 6, the sheath thereof is removed, and a first fiber and cable strength members in the cable are exposed. The cable and the cable strength members are attached to the bracket 6. The first fiber are wound in the storage space of the first fiber winding member 112 formed in the base case 1. The projecting portions 117, 118, and hook member 119 can prevent the first fiber from detaching off the first fiber winding member 112, then the wounded first fiber can be guided out of the base case 1.

An exemplary embodiment of a splitter case 2 of the fiber distribution hub according to the invention will be described in detail with reference to FIGS. 3, 4.

The splitter case 2 substantially can have a rectangular parallelepiped shape which can be disposed over the base case 1. The splice case has a bottom having an upper surface 222 and a front wall extending perpendicularly from the front end 220 of the splice case and two side walls 210, 211 on either side of the splice case. Alternatively, the front end 220 as shown in FIG. 3 may have rounded corners. Two second axles 204 are provided in the front end of the splitter case 2. The pivots can engage with the holes 121 of the poles 114 in the base case 1 to pivotally connect the splitter case 2 to the base case 1.

Alternatively, the two second axles 204 can be provided in the base case 1 and holes 121 can be provided in splitter case 2 for pivot.

Figure 3:
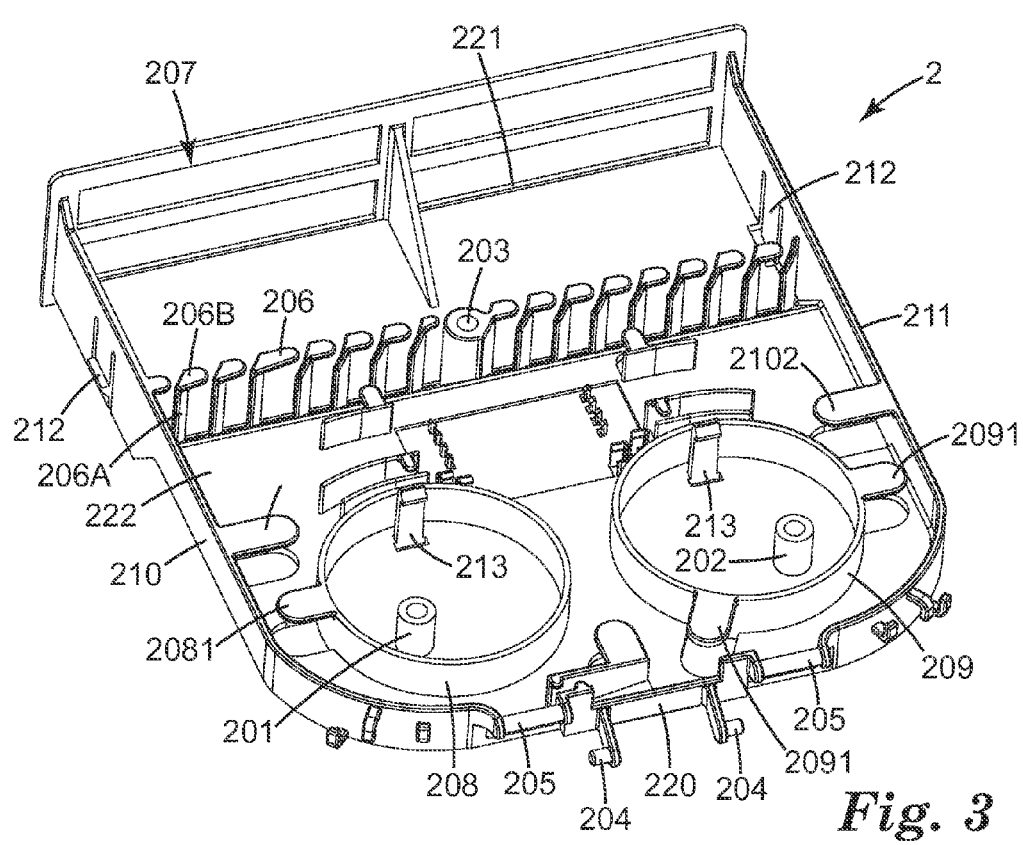
FIG. 3 is a perspective view of a splitter case of the fiber distribution hub in FIG. 1.
Figure 8:
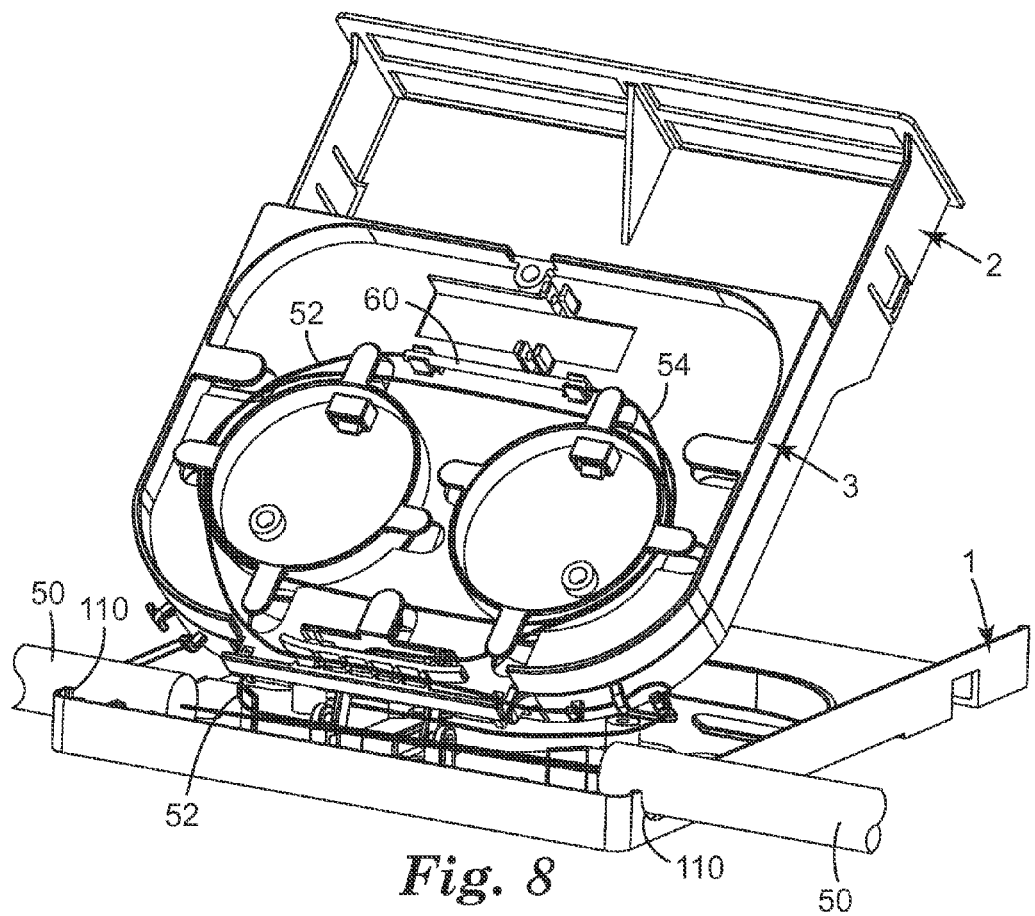
FIG. 8 is a perspective view of the splitter case and the base case, in which the splitter case engages with the base case.

As shown in FIG. 3, the rear end 221 of the splitter case 2 is provided with slots for arranging optical fiber connector adapters 9 as shown in FIG. 8.

A plurality of fiber guides 206 can be arranged along a line across the middle of splitter case 2. The fiber guides 206 has an inverted L-shape having a supporting portion 206A vertical to the upper surface 222 of the splitter case 2 and a suspended arm 206B extending from the top edge of the supporting portion in the width direction of the splitter case 2. In an exemplary embodiment as shown in FIG. 4, the fiber guides 206 are angled with respect to the side walls of the splitter case to conveniently snap the fiber. The fibers can pass through the space formed between the neighboring fiber guides 206.

Two second fiber winding members 208, 209 are provided in the space between the fiber guides 206 and the front wall at the front end 220 of splitter case 2. The second fiber winding members 208, 209 have similar structures with that of the first fiber winding member 112 in the base case. The second fiber winding members 208, 209 can have projecting portions 2081, 2091 at a position opposite side walls 210, 211 of the splitter case 2, respectively. Meanwhile, the side walls 210, 211 have projecting portions 2101, 2102 extending toward the second fiber winding members 208, 209. The projecting portions 2101, 2102 and the second fiber winding members 208, 209 form a fiber storage space. It should be noted that the radius of curvature of the second fiber winding members 208, 209 should be larger than the minimum bending radius of the optical fibers to prevent damage to the fiber transmission during the winding of the fiber around the second fiber winding members 208, 209.

Figure 6:
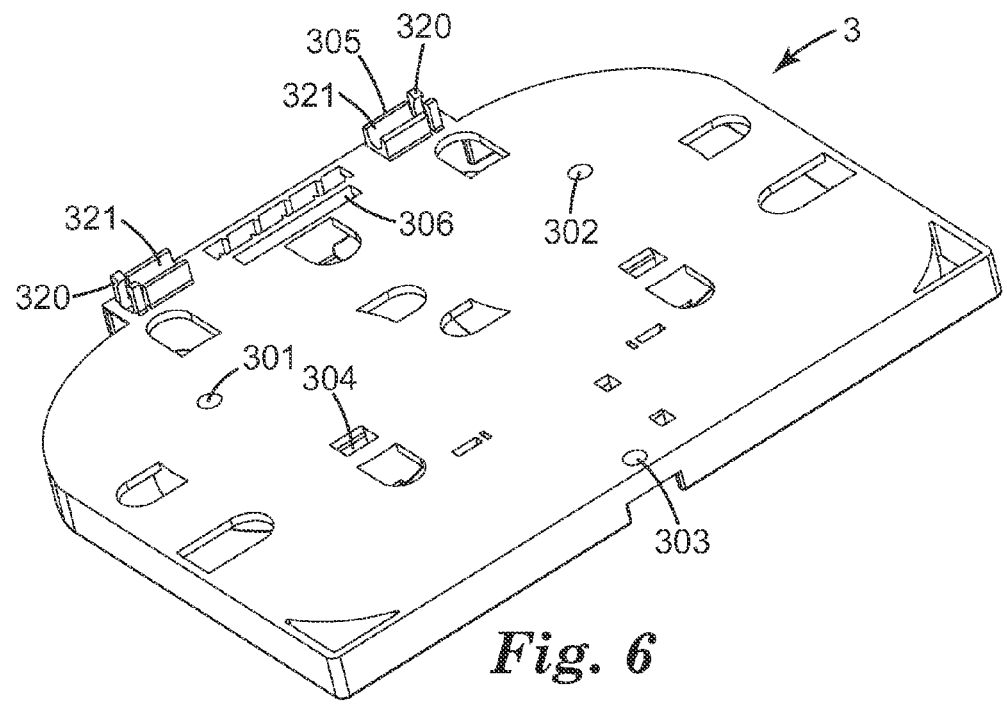
FIG. 6 is a rear perspective view of the splice tray in FIG. 5.

First axles 205 may provided adjacent to the second axles 204 at the front end 220 of splitter case 2. The first axles 205 can be engaged with the base holder 320 (as shown in FIG. 6) of the splice tray 3, so that the splice tray 3 can pivot with respect to the splitter case 2 by the first axles 205 and the base holders 320. It should be noted that the splitter case 2 and the splice tray 3 can be connected with any known pivot connecting means, such as a hinge etc. The splitter case may include rounded corners at the front end of the splitter case 2. Guiding members 218 are formed along the outside radius of the rounded corners to securely guide the optical fiber from the base case 1. In an exemplary embodiment of the present invention, the guiding members 218 are arranged in regular intervals circumferentially and have an L-shaped bar structure. The L-shaped guiding members 218 are provided face to face to form a guiding path for guiding fiber from the base case 1 to the splice tray 3, so that the fiber cannot be easily detached from the guiding members 218.

Figure 4:
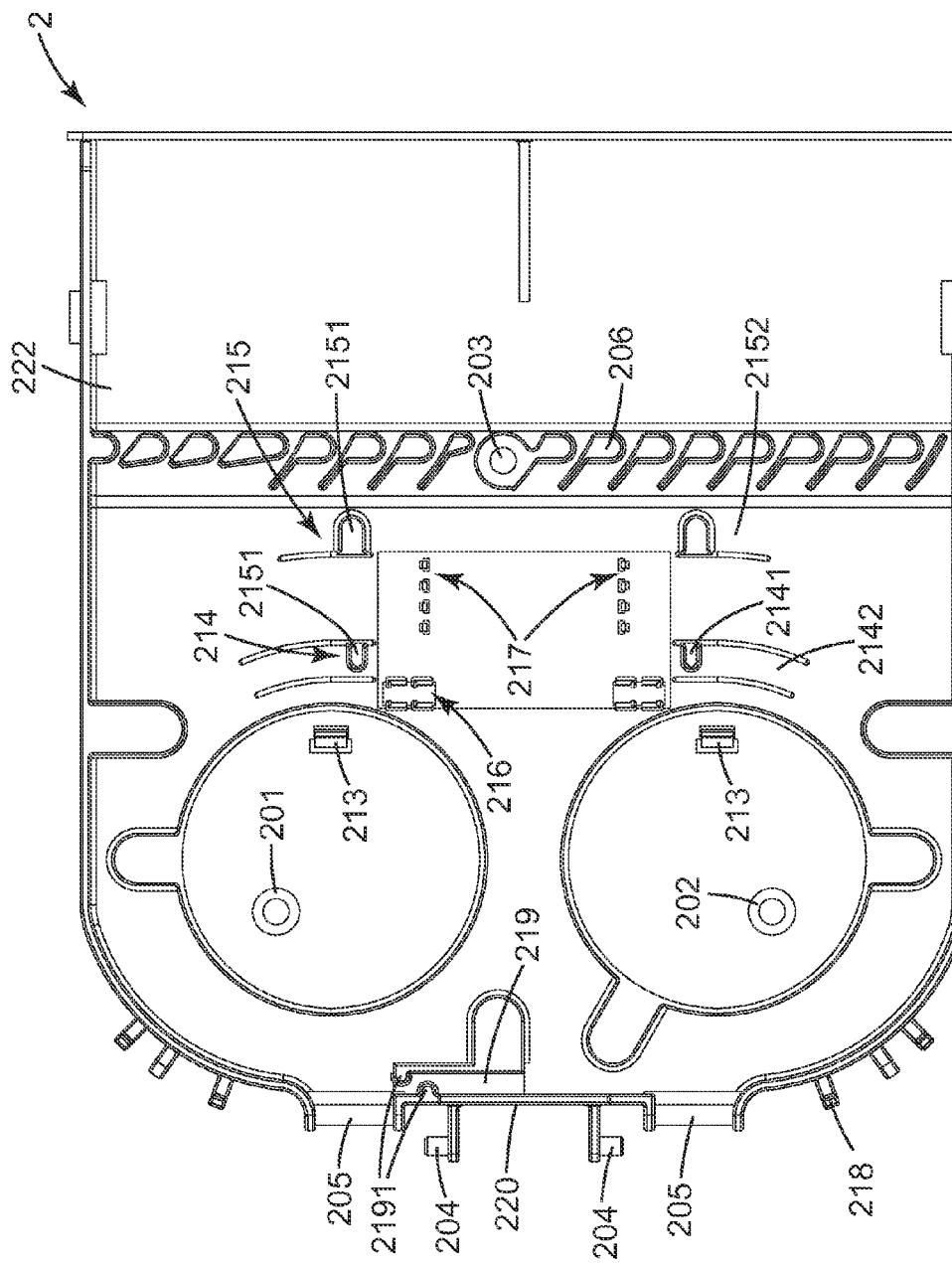
FIG. 4 is a plan view of the splitter case of FIG. 3.

FIG. 4 is a plan view of the splitter case 2. In the center part of the splitter case 2 in FIG. 4, a first retainer 217 is arranged between the second fiber winding members 208, 209 and the fiber guides 206, for holding a fan out part 8. Generally, a ribbon fiber includes a plurality of single fibers (such as 4, 6, 8, 12 etc.) to facilitate fiber management. However, during usage, the ribbon fiber may be divided into a plurality of single fibers which are then terminated with optical fiber connectors. These connectors are then plugged into one side of the fiber optic connector adapters 9 which are provided in slot 207 on the rear end 122 of the splitter case 2 (shown in FIG. 8) to form a patch panel to provide fiber coupling for terminal users.

Figure 12:
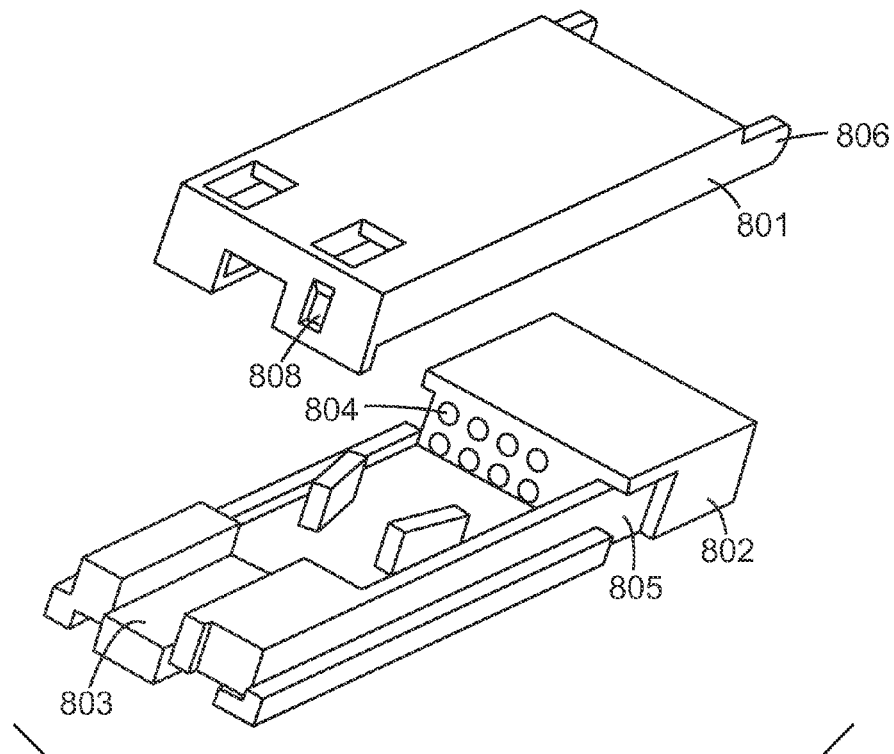
FIG. 12 is a view of a fan out part according to an embodiment of the invention which can be installed to the splitter case.

The fan out part 8, shown in detail in FIG. 12, comprises a detachable cover 801 and a base 802, wherein a recess 803 for guiding the ribbon fiber into the fan out part 8 is formed at an end of the base 802. At the end of the base having the recess, a plurality of holes 804 is formed to separate the individual fibers from the ribbon cable. The fibers exit the fan out part through holes 804. Grooves 805 extend longitudinally down the both sides of the base 802. A pair of tabs 806 may be formed at the front end of the cover 801. The tabs 806 can be inserted into the grooves 805 on either side of the base, to form the assembled fan out part 8.

During usage, the ribbon fiber is firstly introduced into recess 803. The fibers in the ribbon cable are separated into individual single fibers. Each of the individual fibers is fed through one of the holes 804 until the ribbon cable is seated into the base 802 of fan out part 8. The fan out part 8 is assembled by inserting tabs 806 on the detachable cover 801 into grooves 805 on base 802.

A first receiving member 215 for receiving the single fibers is provided between the first retainer 217 and the row of the fiber guides 206. In an exemplary embodiment of the present invention, the first receiving member 215 comprises two projecting portions 2151 and the groove 2152 therebetween. The projecting portion is perpendicular to a projection at a side of the first retainer 217 and extends toward the fiber guides 206. In addition, a second receiving member 214 for storing the ribbon fiber is provided between the first retainer 217 and the second fiber winding members 208, 209. Similar to the first receiving member 215 for receiving single fibers, the second receiving member 214 has two projecting portions 2141 and a groove 2142 therebetween. The projecting portion 2141 is perpendicular to another projection at a side of the first retainer 217 and extends toward the second fiber winding members 208, 209, for preventing the ribbon fiber from detaching away from the groove 2142.

Further, a second retainer 216 for holding a splitter 7 is provided between the second receiving member 214 and the second fiber winding members 208, 209. The splitter provides a connector for coupling one optical fiber to at least two others to form a branch connection. The splitter is generally a relatively rigid unit which must be protected from vibration and shock in order to maintain its performance. It is often held in a cassette or module which also houses the spare lengths of optical fibers to allow subsequent working if maintenance operations or reallocation of the fibers is required after initial installation. In an embodiment of the invention, the splitter 7 is provided in the splitter case for dividing a ribbon fiber into a plurality of single fibers, so that the fibers in the fiber distribution hub 100 can be managed in a clear and neat way.

It should be noted that the first receiving member 215, the first retainer 217, the second receiving member 214 and the second retainer 216 are provided between the fiber guides 206 and the second fiber winding members 208, 209 in turn. However, the invention is not limited thereto, and the installing positions thereof can be changed as necessary, or one or more of the members among them can be omitted.

The splitter case 2 may be securely connected to the splice tray 3, latches 213 provided in the second fiber winding members 208, 209, respectively. The latches 213 are pole structures with a hooked head portion in the cylindrical winding members. When the splitter case 2 and the splice tray 3 pivot to a closed position relative to each other, the splice tray 3 is securely engaged with the splitter case 2 by clipping the latches 213 into latch receiving holes 304 at the back of the splice tray 3. Alternatively, any other device or means that can detachably engage the splice tray 3 with the splitter case 2 can be used.

Referring to FIG. 4, a groove 219 for retaining second fiber is provided at a front end 220 of the splitter case 2. Projecting portions 2191 are provided at both sides of the groove 219, for preventing the second fiber inserted into the groove 219 from detaching away.

In addition, additional features may also be provided in the splitter case 2. For example, second hollow projections 201, 202, 203 may be formed in the splitter case 2 and in alignment with the three screws of the cover. The second hollow projections 201, 202, 203 are hollow, through which screws can pass. Clipping members 212 are formed at both sides of the splitter case 2 for securing the splitter case 2 in a closed position relative to the base case by engaging the clipping members 212 with openings 115 in the base case (see FIG. 9). Here, the structure for securely clipping the splitter case 2 into the base case 1 is only for illustration purpose rather than limiting the scope of the claims, any structure that can securely fix the splitter case 2 with the base case 1 can also be used.

In the following, the route of the fiber in the splitter case 2 will be described with reference to FIGS. 3, 4. A splitter 7 is positioned in second retainer 216. The splitter has an end connected with the second fiber, and the ribbon fiber at the other end of the splitter 7 can be wound around the second fiber winding members 208, 209, then into the second receiving member 214 for storing the redundant ribbon fiber in turn. During usage, after the ribbon fiber winds around the second fiber winding members 209, 208 again, it enters into the first retainer 217 holding the fan out part 8. The ribbon fiber is guided to the recess 803 of the fan out part 8, then the divided multiple single third optical fibers wind around the second fiber winding members 209, 208 and enters into the first receiving member 215 for holding the slender separate third fibers. The third fibers can be guided from the first receiving member 215 and pass through the plurality of fiber guides 206 when needed, and connect with the optical connector 10 (as shown in FIG. 1). The optical connector 10 can be inserted into the fiber connector adapter 9 to provide users with optical signal output. The second optical fiber at an end of the splitter 7 is guided into the groove 219, and it can be introduced into the splice tray 3 through the communication portion 306 at the back of the splice tray 3.

The splice tray 3 of the high density fiber distribution hub 100 according to the invention will be described in detail with reference to FIGS. 5, 6 and 8. The first fiber 52 from the base case 1 and the second fiber 54 from the splitter 7 in the splitter case 2 can be spliced together in the splice tray 3, and the remaining fibers can be stored in the splice tray 3. The splice tray 3 can be pivotally connected to the splitter case 2 via pivot structure.

Figure 5:
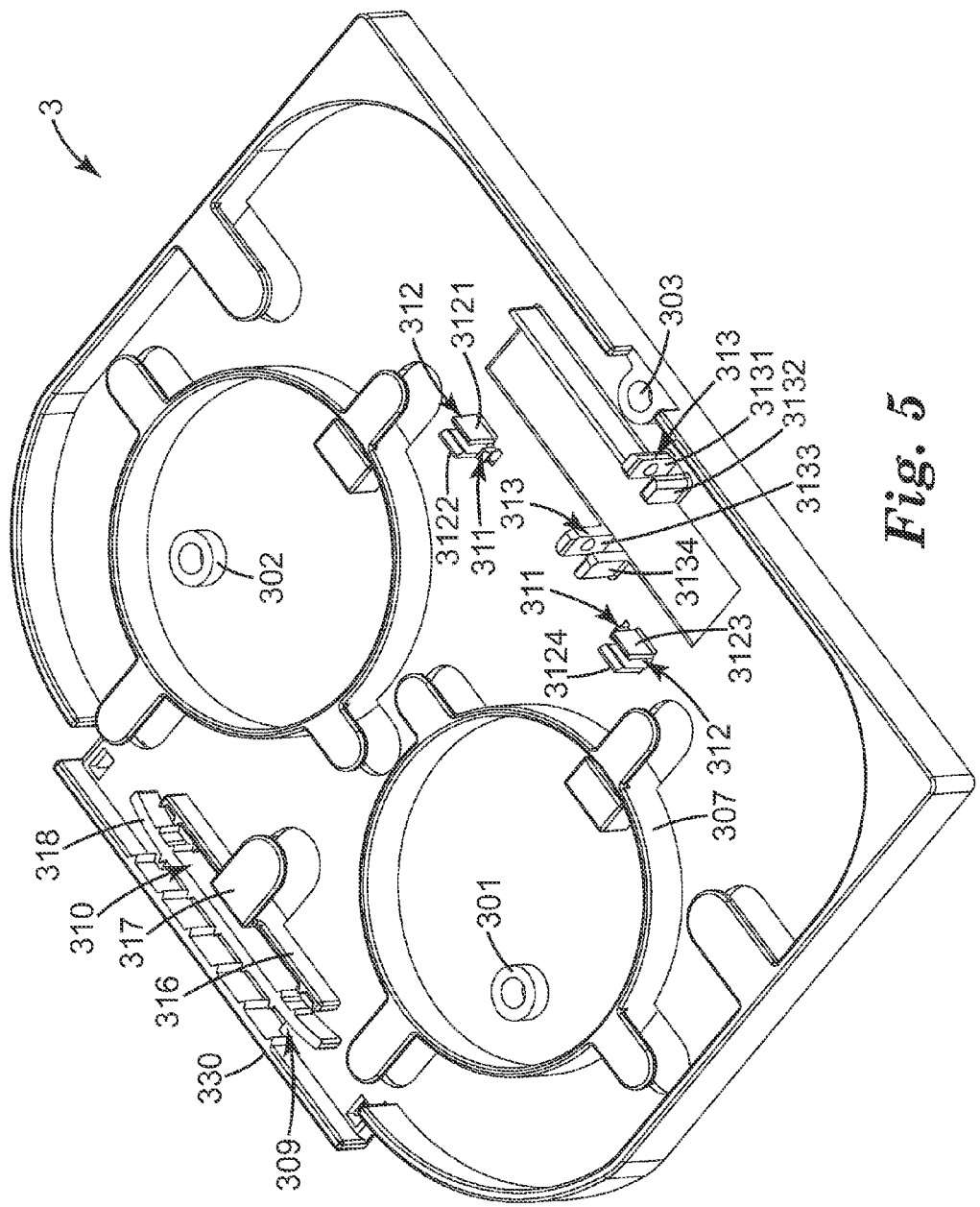
FIG. 5 is a perspective view of a splice tray of the fiber distribution hub in FIG. 1.

FIG. 5 is a perspective view of a splice tray of the fiber distribution hub in FIG. 1. FIG. 6 is a rear perspective view of the splice tray in FIG. 5. In FIG. 5, similar to the base case 1 and the splitter case 2, two third fiber winding members 307, 308 are formed substantially at the center part of the splice tray 3, for simplicity purpose, the detailed description thereof would be omitted hereby.

As shown in FIG. 5, the left side of the splice tray 3 is formed with rounded corners which are corresponded to the similar feature on the front end of the splitter case 2. An extension 330 is formed in the outer wall between the rounded corners. A first receiving portion 309 for receiving and holding the first fiber from the optical cable in the base case 1 and a second receiving portion 310 for receiving and holding the second fiber from the splitter in the splitter case 2 are disposed in the extension 330. In an exemplary embodiment of the present invention, the second receiving portion 310 is formed between first partition wall 316 having a projecting portion 317 for retaining the fibers when wound around the third fiber winding members and a second partition wall 318 separating the first and second receiving portions 309, 310. Fish bone bosses or barbs are formed at the ends of the first and second partition walls 316, 318 to securely hold the second fiber from the splitter case 2. Similarly, fish bone bosses or barbs are formed on the sidewalls of the first receiving portion 309 to securely hold the first fiber from the base case 1 which can enter the splice tray from either of the open sides of the first receiving portion 309. The first receiving portion 309 and the second receiving portion 310 may be substantially parallel to each other.

As shown in FIG. 6, a communicating portion 306 is formed through the back of the splice tray 3. The communication portion 306 is communicated with the second receiving member 310. The second fiber from the splitter 7 in the splitter case 2 can enter into the splice tray 3 through the communication portion 306. Third retainers 305 are provided at both ends of the communicating portion 306 corresponding to the positions where the first axles 205 of the splitter case 2 are arranged. In the embodiment of the present invention, the third retainers 305 comprise an axle receiving groove 321 and a base holder 320 for securing to the first axles 205. However, it should be noted that any alternative pivot structure can be used. The detailed structure of the third retainer 305 is only for illustration purpose, rather than confining the protection scope of the invention. In addition, latch receiving holes 304 are through the back of the splice tray 3 at the positions corresponding to a position where the latches 213 are provided in the splitter case, thus the splitter case 2 and the splice tray 3 can be clipped together when the latch is locked into the latch receiving holes.

In the following, the splice structure for splicing the second fiber 54 from the splitter 7 in the splitter case 2 and the first fiber 52 in the cable in the base case 1, shown in FIG. 8, will be described in detail.

There are different way of connecting optical fibers including mechanical splice, fusion splicing and optical fiber connectors. The high density fiber distribution hub 100 according to an embodiment of the invention may accommodate each of these connection means therein. In the splice tray 3 of the present invention, a fusion splice bracket 312 is formed in the splice tray 3 along a lateral side thereof. The fusion splice bracket is composed of two upright posts. As shown in FIG. 5, the fusion splice bracket 312 comprises U-shaped brackets, each having a pair of elastic arms 3121, 3122; 3123, 3124. The inner wall of each elastic arm 3121, 3122; 3123, 3124 may be curved to match the cylindrical wall of a conventional fusion splice sleeve. When the fusion splice sleeve 60 is inserted into the fusion splice bracket 312, the elastic arms 3121, 3122; 3123, 3124 grasp the fusion splice sleeve to hold it in place.

In addition, mechanical splice brackets 311 may be located between the fusion splice brackets. Alternatively, the fusion splice brackets and the mechanical splice brackets may be arranged such that they are parallel to each other. The mechanical splice bracket 311 is a hook shaped member with an inverted "L" shape. The mechanical bracket grasps the housing of the mechanical splice (not shown), such as a 3M™ Fibrlok™ II Fiber Splice available from 3M Company, St. Paul, Minn., USA, to secure the mechanical splice in the splice tray.

Further, the conventional fibers can be connected by an optical fiber connector utilizing a conventional optical fiber connector adapter or coupling 9. Fiber connectors may be connectors such as a SC, MTRJ, MU, ST, FC, or LC connectors, to name a few, and may be, for example, either a positive contact (PC) or an angled polished connector (APC) type of connector. Sample connectors include 3M™ No Polish Connector SC Plug, 3M™ Hot Melt LC Connector, and 3M™ CRIMPLOK™ ST SM 126 UM Connector, each of which is available from 3M Company (St. Paul, Minn.).

As shown in FIG. 5, the fiber optic connector adapter bracket 313 may comprise a plurality of posts 3131, 3132; 3133, 3134. Flanges 9A, 9B on the fiber optic connector adapter 9 (shown in FIG. 1) may be inserted between the posts 3131, 3132; 3133, 3134. Two optical fiber connectors may be inserted into either side of the optical fiber connector adapter to create an optical connection.

In addition, a plurality of third hollow projections 301, 302, 303 are formed on the splice tray 3. The third hollow projections 301, 302, 303 can be aligned with the second hollow projections 201, 202, 203 in the splitter case and the first hollow projections in the base case and screws can pass through the aligned and stacked hollow projections in the base case, splitter case and the splice tray.

Figure 7:
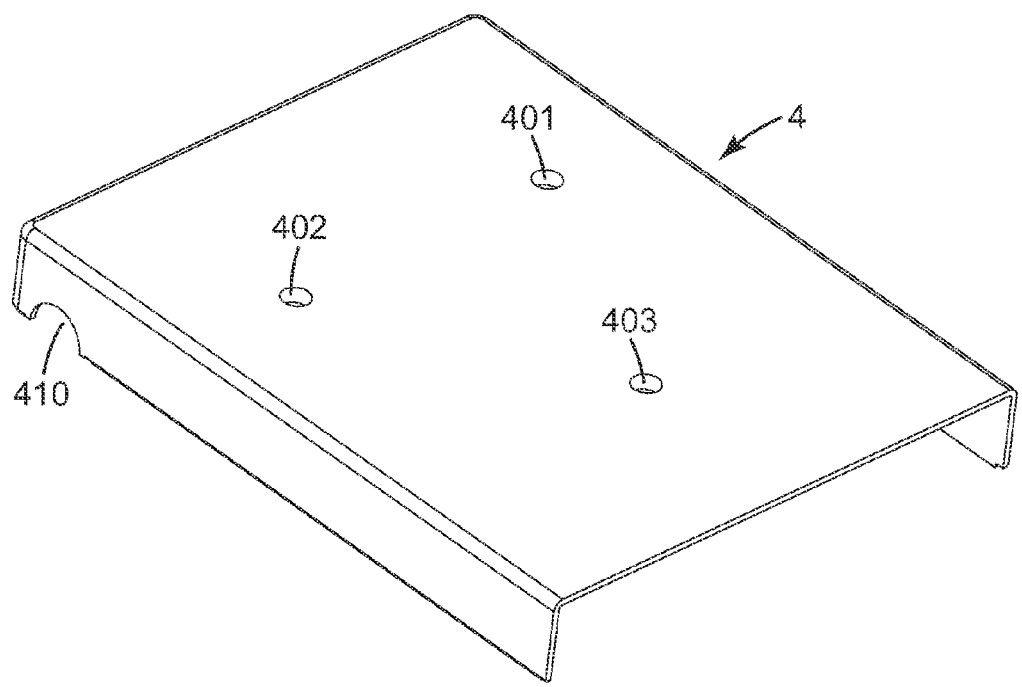
FIG. 7 is a perspective view of a cover of the fiber distribution hub in FIG. 1.

Hereafter, the cover 4 will be described in detail with reference to FIG. 7. The cover 4 has a corresponding shape with that of the base case 1 to form a complete rectangular parallelepiped. Three screw holes 401, 402, 403 are formed on the top surface of the cover 4. Long screws can be used for fixing the fiber distribution hub 100 by inserted through the screw holes 401, 402, 403, the third hollow projections 301, 302, 303 of the splice tray 3, the second hollow projections 201, 202, 203 of the splitter case 2 and the first hollow projections 101, 102, 103 of the base case 1. It should be noted, the screws for fixing the components of the fiber distribution hub 100 are not limited to three, and the number of the screws can be selected suitably as long as they can fix the components of the fiber distribution hub 100 accordingly.

In addition, the cover 4 is formed with four port portions 410 corresponding to those of the base case 1 for forming complete circular ports with the port portions 110 of the base case 1.

The assembled structure of the high density fiber distribution hub 100 will be described with reference to FIGS. 8-11. FIG. 8 is an assembled view of the splitter case 2 and the base case 1 in a closed position, in which the splitter case 2 engages the base case 1. This can be achieved by mounting the second axles 204 of the splitter case 2 to the poles 114 of the base case 1. After assembly, the splitter case 2 is rotatable with respect to the base case 1, so that fiber management and operations can be undertaken in the base case. Clipping member 212 on the splitter case mate with openings 115 in the base case to secure the splitter case in a closed position relative to the base case.

Figure 11:
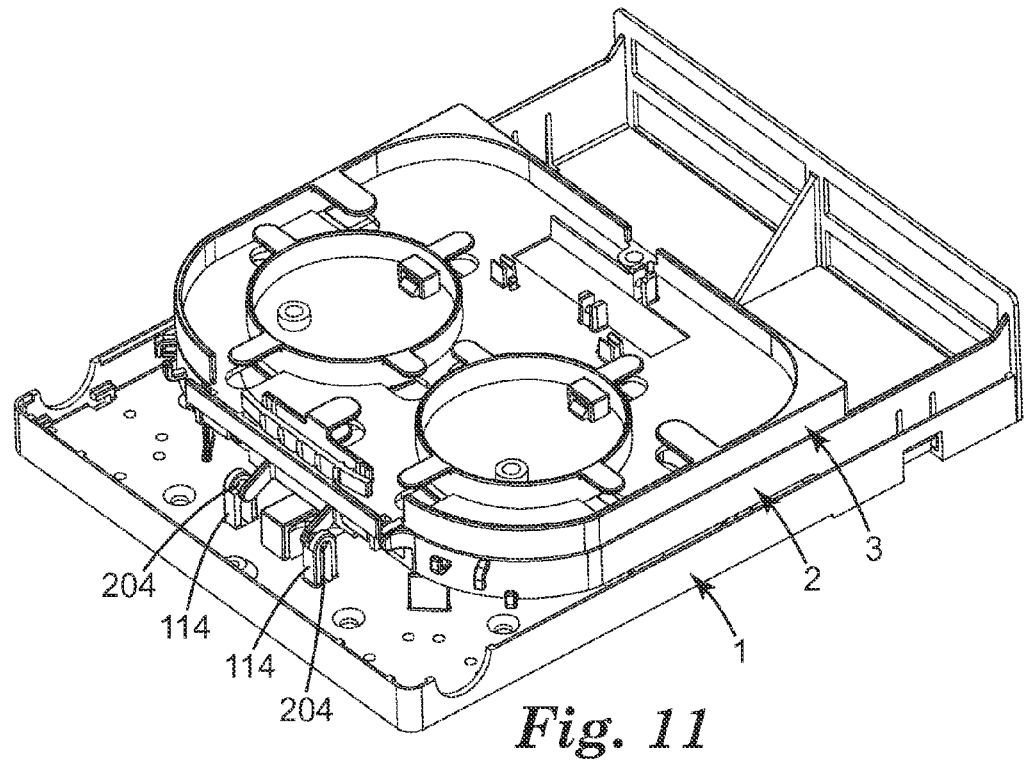
FIG. 11 is a perspective view of the high density fiber distribution hub with the cover removed according to an embodiment of the invention.

FIG. 11 is a perspective view of the splitter case 2, splice tray 3 and the base case 1 being engaged together. The splice tray 3 adjoins with the splitter case 2 in a closed position while introducing fibers into the base case 1. The first axles 205 on the splitter case engage with the third retainer at the back of the splice tray 3, and the latches of the splitter case 2 engage with the latch receiving holes on the splice tray 3 can hold the splice tray and the splitter tray together, and when access to the base case is needed. To access the base case, clipping members 212 are release from openings 115 on the base case so that the splitter case is free to rotate to an open position. This facilitates the management of fibers in the base case without disrupting the fibers in the splitter case 2 or in the splice tray 3.

Figure 10:
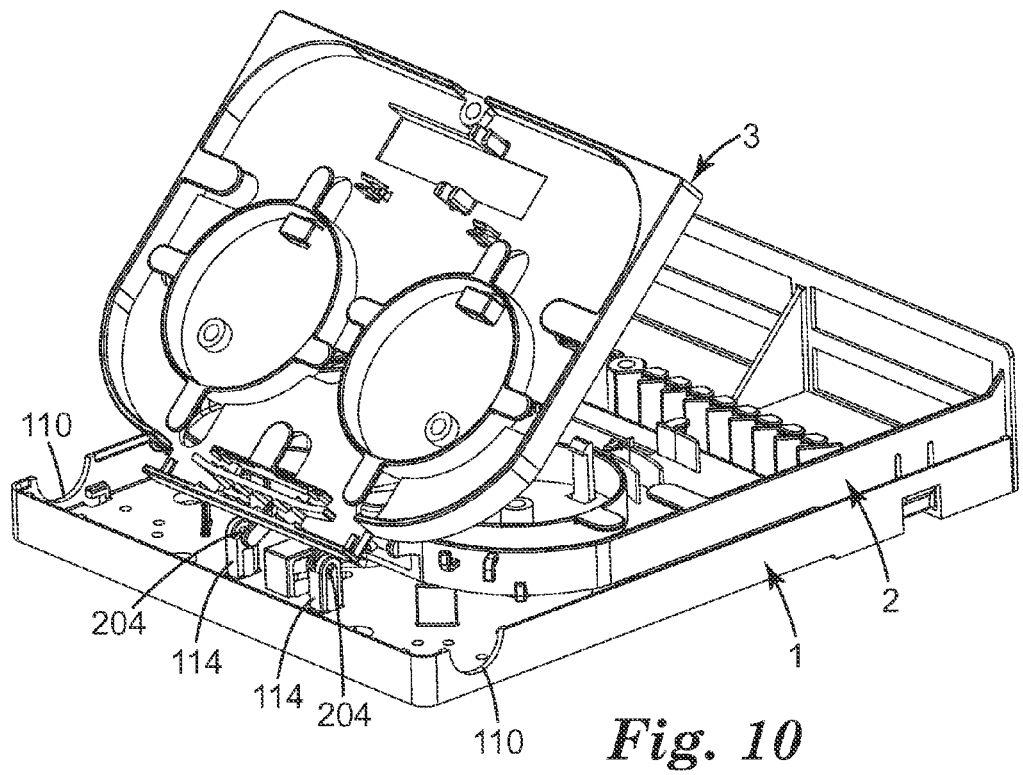
FIG. 10 is a perspective view of the splitter case, splice tray and the base case being engaged together according to an embodiment of the invention, in which the splice tray forms a certain angle with respect to the splitter case.

In FIG. 10, the splice tray 3 is in an open position with respect to the splitter case 2 and the base case which are in a closed position relative to each other. FIG. 11 shows an assembled view of the high density fiber distribution hub 100' according to an embodiment of the present invention, in which the cover 4 is removed. The splice tray 3, the splitter case and the base case are all in a close position relative to each other.

From the assembly above, the on-site operation is very simple with the high density fiber distribution hub 100, which does not need separate tool or burdensome manual operation. In addition, the assembly/disassembly of the fiber distribution hub 100 is convenient, thus decreasing the maintenance cost and the operations of workers.

In the following, the routing of the fibers in the fiber distribution hub 100 will be described in detail in combination with the components described above. An optical cable is introduced into the base case 1 through the portion portions 110, then it is fixed by the bracket 6, and the sheath of the cable is peeled away to expose the first fiber and the cable reinforcing member. The cable reinforcing member is fixed to the bracket, and then the bracket 6 is fixed to the base case 1 accordingly so that the incoming cable is fixed accordingly. The peeled first fiber winds around the first fiber winding member 112 along the inner wall of the base case 1. Due to the clearance between the sidewall of the base case 1 and the corresponding sidewall of the splitter case 2 in a closed state, the first fiber can be guided to the outer wall of the splitter wall by the guiding member 218 formed thereon. And the first fiber is guided by the guiding member 218 and entered into the first receiving portion 309 of the splice tray 3. The fish bone bosses or barbs at both sides of the first receiving portion 309 stably hold the first fiber. The first fiber entering into the splice tray 3 is wound around the third winding members in FIG. 5.

On the other hand, the second fiber in the splitter case 2 is wound in the second fiber winding members 208, 209. And an end of the second fiber 54 (FIG. 8) is introduced into the groove 219, which is securely held in the groove 219 by the projecting portions 2191. Then, the second fiber is introduced into the splice tray 3 through the communication portion 306 at the back of the splice tray 3. The second fiber is contained in the second receiving portion 310 and securely held by the fish bone bosses or barbs on the first and second partition walls 316, 318. Then, the second fiber entered into the splice tray 3 is wound around the third winding members in a direction opposite to that of the first fiber 52 winding around the winding members. And the first and second fibers can be connected to each other with the splice manners 60 mentioned previously.

Figure 9:
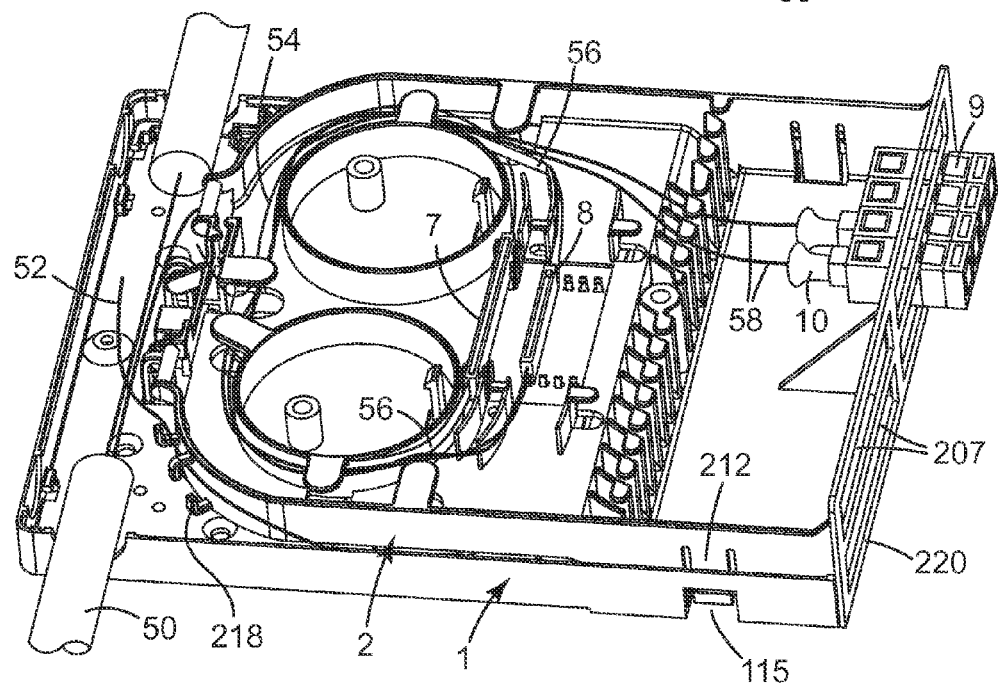
FIG. 9 is a perspective view of the splitter case, splice tray and the base case being engaged together according to an embodiment of the invention, in which the splitter case clipped together with the splice tray forms a certain angle with the base case.

In the splitter case 2, the splitter 7 is positioned on the second retainer 216, with an end thereof connected with the second fiber, and the other end thereof connected with the ribbon fiber 56 as shown in FIG. 9. Extra ribbon fiber can be wound around the second fiber winding members 208, 209 and stored in the second receiving member 214. Meanwhile, the other end of the ribbon fiber 56 can be connected to the fan out part 8 provided on the first retainer 217 and a plurality of third fibers 58 are divided from the fan out part 8. The redundant third fibers can be wound around the second fiber winding members 208, 209 in a clockwise direction and contained by the first receiving member 215. The other ends of the third fibers 58 can be connected with the optical connectors 10 as shown in FIG. 1 by corresponding fiber guides 206, and then the optical connector 10 is connected to the fiber connector adapter 9.

In general, the first fiber 52 is derived from the optical cable 50 from outside, such as Office etc., entered into the base case 1. And the first fiber enters into the splice tray after winding in the base case 1. In the splice tray 3, the first fiber 52 and the second fiber 54 are spliced by fusion splice 60 or mechanical splice. Further, most of the second fiber is stored in the splitter case 2, and the other end of the second fiber is connected with the ribbon fiber 56, which would be divided into a plurality of third fibers 58. And the third fibers can be coupled to the connector adapter 9 by the optical connector 10 to provide optical output for end users.

Thus, the optical fiber distribution hub according to an embodiment of the invention assembles the fiber storage, fiber splice, fiber distribution together, thus achieving single input multiple output function or multiple input single input function. The fiber distribution hub according to the embodiment of the invention has a compact structure with modular function, which facilitates on-site operation of the fiber distribution hub and reduces the time for cable introduction and fiber splice.

While the embodiments of the present invention have been described by way of examples taken in conjunction with the accompanying drawings, it should be appreciated that modifications, additions and variations to and from the above described embodiments may be made without deviating from the scope of the present invention which is defined by the accompanying claims.

What is claimed:

1. A fiber distribution hub, comprising:
   a base case comprising at least one port portion for introducing an optical cable, wherein the optical cable includes a first fiber, and poles formed near the side where the port portion is provided;
   a splitter case releasably attached to the base case, wherein the splitter case comprises first axles at a side of the splitter case that engage with the poles on the base case, such that the splitter case is rotatably and hingeably connected to the base case at a bottom side of the splitter case, slots for mounting optical fiber connector adapters at a rear end of the splitter case on the side opposite that provided with the first axles, and a splitter disposed within the splitter case;
   a splice tray rotatably hinged to the splitter case; and
   a cover engagable with the base case to enclose the splitter case and the splice tray, wherein the first fiber is connected to a second fiber in the splice tray, and the second fiber is connected with the splitter disposed in the splitter case to separate the second fiber into a plurality of separate third fibers.

2. The fiber distribution hub of claim 1, wherein the first fiber is connected to the second fiber in the splice tray with a mechanical splice.

3. The fiber distribution hub according to claim 1, wherein the base case further comprises a fiber storage compartment, the fiber storage compartment having a first fiber winding member formed at the center thereof, the first fiber winding member is formed with projecting portions perpendicular to an circumferential wall of the first fiber winding member to prevent any stored fiber from detaching from the first fiber winding member.

4. The fiber distribution hub according to claim 1, wherein the base case further comprises openings at both opposing sides thereof for clipping with the splitter case.

5. The fiber distribution hub according to claim 1, wherein a row of fiber guides are provided at the inner side of the slots in the splitter case, for guiding third fibers from the splitter into the optical fiber connectors respectively, the optical fiber connectors being inserted into the optical fiber connector adapters.

6. The fiber distribution hub according to claim 5, wherein each of the fiber guides comprises an upright supporting portion and a suspending portion extending laterally from an end of the supporting portion, and the fiber guides are angled with respect to a side of the splitter case.

7. The fiber distribution hub according to claim 6, wherein two second fiber winding members are provided between the fiber guides and the first axles.

8. The fiber distribution hub according to claim 7, wherein a first retainer for holding at least one fan out part is provided between the fiber guides and the two second fiber winding members.

9. The fiber distribution hub according to claim 8, wherein a first receiving member for receiving a single fiber is provided between a first retainer and the row of fiber guides.

10. The fiber distribution hub according to claim 8, wherein a second receiving member for storing the ribbon fiber is provided between the first retainer and the two second fiber winding members.

11. The fiber distribution hub according to claim 10, wherein a second retainer for holding the splitter is provided between the second receiving member and the two second fiber winding members.

12. The fiber distribution hub according to claim 7, wherein latches for clipping the splice tray are provided inside the two second fiber winding members of the splitter case.

13. The fiber distribution hub according to claim 12, wherein latch receiving holes are provided on the back side of the splice tray at a corresponding positions to a position of the splitter case where the clipping members are formed, so that the splice tray can be secured to the splitter case in a closed position.

14. The fiber distribution hub according to claim 1, wherein second axles for engaging the splice tray are provided between the first axles respectively.

15. The fiber distribution hub according to claim 14, wherein a third retainer for engaging with the second axles are formed on the bottom of the splice tray at the corresponding positions where the second axles of the splitter case are provided.

16. The fiber distribution hub according to claim 15, wherein the splice tray is provided with a communicating portion where the second fiber from the splitter of the splitter case can enter into the splice tray.

17. The fiber distribution hub according to claim 16, wherein a first receiving portion for holding the first fiber from the optical cable in the base case and a second receiving portion for holding the second fiber from the splitter in the splitter case are provided at a side of the splice tray, the first receiving portion and the second receiving portion are parallel to each other, and the second receiving portion is communicated with the communicating portion.

* * * * *